US012608717B2

(12) United States Patent
Wang et al.

(10) Patent No.: US 12,608,717 B2
(45) Date of Patent: Apr. 21, 2026

(54) METHOD OF MONITORING, EVALUATING AND EARLY-WARNING SOIL AND GROUNDWATER POLLUTION IN INDUSTRIAL PARK

(71) Applicant: BEIJING MUNICIPAL RESEARCH INSTITUTE OF ECO-ENVIRONMENTAL PROTECTION, Beijing (CN)

(72) Inventors: Shijie Wang, Beijing (CN); Yuan Zhang, Beijing (CN); Tianxiang Xia, Beijing (CN); Lin Jiang, Beijing (CN); Maosheng Zhong, Beijing (CN)

(73) Assignee: BEIJING MUNICIPAL RESEARCH INSTITUTE OF ECO-ENVIRONMENTAL PROTECTION, Beijing (CN)

( * ) Notice: Subject to any disclaimer, the term of this patent is extended or adjusted under 35 U.S.C. 154(b) by 463 days.

(21) Appl. No.: 18/117,548

(22) Filed: Mar. 6, 2023

(65) Prior Publication Data

US 2024/0135389 A1    Apr. 25, 2024
US 2024/0232909 A9    Jul. 11, 2024

(30) Foreign Application Priority Data

Oct. 24, 2022    (CN) .......................... 202211304262.8

(51) Int. Cl.
   *G06Q 30/018*     (2023.01)
   *G01M 3/04*     (2006.01)
   *G06Q 10/0635*     (2023.01)

(52) U.S. Cl.
   CPC ........... *G06Q 30/018* (2013.01); *G01M 3/04* (2013.01); *G06Q 10/0635* (2013.01)

(58) Field of Classification Search
   CPC .... G01M 3/165; G01M 3/04; G06Q 10/0635; G06Q 30/018
   See application file for complete search history.

(56) References Cited

U.S. PATENT DOCUMENTS

2016/0045841 A1*   2/2016   Kaplan ................. C01B 17/027
                                        429/49

FOREIGN PATENT DOCUMENTS

| CN | 102222172 | * | 10/2011 |
| CN | 107145672 | * | 9/2017 |
| CN | 107563597 | * | 1/2018 |
| CN | 111612360 | * | 9/2020 |
| CN | 113313399 | * | 8/2021 |
| CN | 113962534 | * | 1/2022 |
| CN | 114662820 | * | 6/2022 |
| CN | 114662844 | * | 6/2022 |
| CN | 114720657 | * | 7/2022 |
| JP | 2016107224 | * | 6/2016 |
| RU | 2731662 | * | 9/2020 |

* cited by examiner

*Primary Examiner* — Catherine T. Rastovski

(57) ABSTRACT

The present disclosure provides a method of monitoring, evaluating and early-warning pollution for key pollution sources in an industrial park. The method comprises: a multi-index on-line early-warning monitoring method for pollution from key pollution sources, a hierarchical pollution risk evaluating method, and a pollution early-warning grade evaluating method, which are in line with the environmental management solution that pollution prevention is the priority in an industrial park in China.

3 Claims, 4 Drawing Sheets

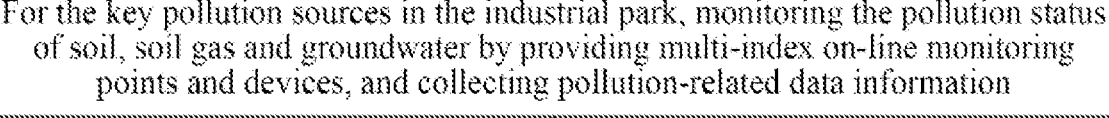

For the key pollution sources in the industrial park, monitoring the pollution status of soil, soil gas and groundwater by providing multi-index on-line monitoring points and devices, and collecting pollution-related data information Establishing a groundwater pollution risk evaluating method based on pollution source load risk, potential hazard of pollution sources and groundwater vulnerability according to the information about key pollution sources and hydrogeology in the industrial park Establishing an enterprise and park pollution early-warning evaluating method based on the pollution status of soil and groundwater according to the data from soil and groundwater pollution monitoring system in the industrial park

FIG. 1

METHOD OF MONITORING, EVALUATING AND EARLY-WARNING SOIL AND GROUNDWATER POLLUTION IN INDUSTRIAL PARK

CROSS REFERENCE TO RELATED APPLICATION(S)

This application claims priority to China Patent Application No. 202211304262.8, filed on Oct. 24, 2022, in China Patent Office and entitled "METHOD OF MONITORING, EVALUATING AND EARLY-WARNING SOIL AND GROUNDWATER POLLUTION IN INDUSTRIAL PARK", which is hereby incorporated by reference in its entirety.

TECHNICAL FIELD

The present disclosure relates to the technical field of pollution evaluating and early-warning in an industrial park, in particular to an integrated method of monitoring, evaluating and early-warning soil and groundwater pollution in an industrial park.

BACKGROUND

The soil and groundwater pollution in the industrial park is serious. The survey bulletin results of the soil pollution status in China show that among 2,523 soil points in 146 industrial parks surveyed, the over-standard points account for 29.4%. In recent years, China has gradually established and improved the pollution monitoring system in the industrial park. However, the monitoring network and the monitoring system for soil and groundwater pollution are constructed late, the soil and groundwater pollution status in the industrial park is unknown, and there is a lack of an effective pollution risk evaluating and pollution preventing and early-warning method. Therefore, in order to grasp the soil and groundwater pollution status in the industrial park in time, efficiently judge the pollution evolution trend and effectively take pollution prevention measures, it is urgent to establish a method of monitoring, evaluating and early-warning soil and groundwater pollution in the industrial park, which will provide technical support for the management of soil and groundwater pollution prevention in the industrial park.

SUMMARY

The purpose of the present disclosure is to provide a method of monitoring, evaluating and early-warning soil and groundwater pollution in an industrial park, which can monitor, evaluate and early warn the key pollution to the producing enterprises in the industrial parks, and provide reference for pollution control in chemical industrial parks.

In order to achieve the above purpose, the present disclosure provides the following schemes:

A method of monitoring, evaluating and early-warning pollution for key pollution sources in an industrial park, comprises:

Step 1: for the key pollution sources in the industrial park, monitoring pollution status of soil, soil gas and groundwater by providing multi-index on-line monitoring points and devices, and collecting pollution-related data information;

Step 2: establishing a groundwater pollution risk evaluating method based on a pollution source load risk, potential hazard of pollution sources and groundwater vulnerability according to the information about key pollution sources and hydrogeology in the industrial park; and Step 3: establishing an enterprise and park pollution early-warning evaluating method based on the pollution status of soil and groundwater according to data from a soil and groundwater pollution monitoring system in the industrial park.

In one embodiment, in Step 2, establishing the groundwater pollution risk evaluating method based on the pollution source load risk, the potential hazard of the pollution sources and the groundwater vulnerability according to the information about the key pollution sources and the hydrogeology in the industrial park, specifically comprises steps 201-204.

Step 201: the pollution source load risk is evaluated according to a pollution source kind, a pollutant production quantity, pollutant release likelihood and a pollution buffer distance in the pollution information.

Specifically, the pollution source kind K, the pollutant production quantity Q, the pollutant release likelihood L and the pollution buffer distance D are acquired, where the pollution source kind is divided into industrial pollution sources and other types of pollution sources, which is specifically divided into petrochemical engineering, coking, chemical raw materials and chemicals manufacturing, electroplating, nonferrous metal smelting, ferrous metal smelting, leather making, paper making, metal product manufacturing, textiles and hazardous waste disposal sites without lining protection, hazardous waste storage sites without lining protection, gas stations, petroleum product storage areas, general waste disposal sites without lining protection, general waste landfill sites without lining protection, general waste landfill sites with high groundwater level, and general waste landfill sites in valleys with low groundwater level. The pollution sources are classified, graded, and assigned, where values of K and D of petrochemical engineering, coking and unlined hazardous waste disposal sites are 9 and 2, respectively, values of K and D of chemical raw materials and chemicals manufacturing, electroplating and unlined hazardous waste storage sites are 8 and 2, respectively, values of K and D of nonferrous metal smelting, gas stations and petroleum product storage areas are 7 and 1.5, respectively, values of K and D of ferrous metal smelting and unlined general waste disposal sites are 6 and 1, respectively, values of K and D of leather making, paper making and unlined general waste landfill sites are 5 and 1.5, respectively, values of K and D of metal product manufacturing and general waste landfill sites with high groundwater level are 4 and 0.5, respectively, values of K and D of textiles are 3 and 1, respectively, values of K and D of food are 2 and 0.5, respectively, and values of K and D of other industries and general waste landfill sites in valleys with low groundwater level are 1 and 0.5, respectively.

The pollutant production quantity Q is classified and graded according to the discharge amount of wastewater of industrial sources, the disposal amount of waste disposal sites, the landfill amount of landfill sites, the number of oil tanks in gas stations and petroleum product storage areas. The assignment range of the pollutant production quantity Q is between 1 and 12;

The pollutant release likelihood L comprises a pollutant release likelihood $L_1$ and a likelihood of pollutant reaching groundwater $L_2$, and L is the sum of $L_1$ and $L_2$. The pollutant release likelihood $L_1$ is graded and assigned from 0.1 to 1.0 according to industrial sources, waste disposal sites, landfill sites, gas stations, petroleum product storage areas, pollution source historical time and protective measures. The likelihood of pollutant reaching groundwater $L_2$ is graded and assigned as 1.0, 0.9, 0.8, 0.6, 0.4, 0.2 according to inorganic salt ions, hexavalent chromium, chlorinated hydrocarbons, benzene series, metal ions and other hydrophobic organic substances.

The calculation formula of the load risk index of a single pollution source is:

$$P=K*Q*L*D.$$

Step 202: the potential hazard of the pollution sources is evaluated according to the nature of pollutants in the pollution information and the characteristics of the pollution sources.

Specifically, an evaluation parameter index system of the potential hazard of the pollution sources is acquired, which includes toxicity, mobility, persistence, equal standard load, discharge position, pollution occurrence probability, affected area and the pollution duration. The potential hazard of pollution sources is evaluated according to the evaluation parameter index system of the potential hazard of the pollution sources, that is, a potential hazard index of a pollution source is calculated by the formulas:

$$S_j = \sum_{i=1}^{n} C_{ij} \times Q_{ij}$$

$$C_{ij}=T_{ij}W_T+M_{ij}W_M+D_{ij}W_D+L_{ij}W_L+S_{ij}W_S+P_{ij}W_P+ \\ A_{ij}W_A+C_{ij}W_C,$$

where $S_j$ is quantitative characterization of pollution ability of a pollution source j to groundwater pollution, namely hazard of the pollution sources, $C_{ij}$ is quantitative characterization of eight self-attributes of an i-th characteristic pollutant of the pollution source j, namely hazard of characteristic pollutants, $Q_{ij}$ denotes the quantity of the i-th pollutant discharged by the pollution source j entering the groundwater environment, namely the discharge amount, $T_{ij}$, $M_{ij}$, $D_{ij}$, $L_{ij}$, $S_{ij}$, $P_{ij}$, $A_{ij}$, $C_{ij}$ are quantitative indexes of toxicity, mobility, degradability, equal standard load, discharge position, pollution occurrence probability, affected area and duration of the i-th characteristic pollutant of the pollution source j, respectively, $W_T$, $W_M$, $W_D$, $W_L$, $W_S$, $W_P$, $W_A$, $W_C$ are weight values of toxicity, mobility, degradability, equal standard load, discharge position, pollution occurrence probability, affected area and duration, where $W_T=0.2650$, $W_M=0.1325$, $W_P=0.1325$, $W_L=0.1100$, $W_S=0.1943$, $W_P=0.0957$, $W_A=0.0350$, $W_C=0.0350$.

Step 203: groundwater vulnerability according to depth to the watertable, aquifer net recharge, aquifer material, soil type, topography, impact of the vadose zone and hydraulic conductivity of aquifer in pollution information is evaluated.

Specifically, groundwater vulnerability evaluation indexes, including depth to the watertable D, aquifer net recharge R, aquifer material A, soil type S, topography T, impact of the vadose zone I and hydraulic conductivity of aquifer C are acquired, and a DRASTIC method for calculation is used to obtain vulnerability indexes:

$$DRASTIC=0.22\times D+0.17\times R+0.13\times A+0.09\times S+0.04\times \\ T+0.22\times I+0.13\times C.$$

4

Step 204: The groundwater pollution risk is evaluated according to the pollution source load risk, the potential hazard of the pollution sources and the groundwater vulnerability.

Specifically, the groundwater pollution risk of a single pollution source is comprehensively evaluated according to the load risk, potential hazard and groundwater vulnerability of the pollution sources as follows:

$$R_i=S_i\times D_i\times P_i,$$

where $R_i$ is a comprehensive index of a groundwater pollution risk of the i-th pollution source, $S_i$ is a potential hazard index of the i-th pollution source, $D_i$ is a groundwater vulnerability index of the i-th pollution source, and $P_i$ is a load risk index of the i-th pollution source.

The groundwater pollution risk of multiple pollution sources is comprehensively evaluated using the function of a grid calculator in geographic information system (GIS) to calculate risk superposition of multiple pollution sources with different types, and the comprehensive index of the groundwater pollution risk of multiple pollution sources is calculated with the following formula:

$$R=\Sigma W_i\times R_i,$$

where R is the comprehensive index of the groundwater pollution risk of multiple pollution sources, $W_i$ is a weight of the i-th pollution source, $R_i$ is an index of the groundwater pollution risk of the i-th pollution source, where $W_i$ is classified, graded and assigned according to the pollution sources as follows: petrochemical engineering, coking, chemical raw materials and chemicals manufacturing, and electroplating industrial sources are assigned 5, nonferrous metal smelting, ferrous metal smelting, leather making, paper making and metal product manufacturing industrial sources are assigned 4, hazardous waste disposal sites are assigned 3, general waste disposal sites are assigned 2, hazardous waste landfill sites are assigned 4, general waste landfill sites are assigned 3, gas stations are assigned 2, and large-scale petroleum product storage areas are assigned 3.

In one embodiment, in Step 3, establishing the enterprise and park pollution early-warning evaluating method based on the pollution status of soil and groundwater according to the data of the soil and groundwater pollution monitoring system in the industrial park specifically comprises:

Step 301, evaluating soil pollution status according to positions of soil pollution monitoring points, nature of pollutants and a pollution degree in the pollution information, and establishing a soil pollution early-warning grade evaluation matrix;

Step 302, evaluating groundwater pollution status according to positions of groundwater pollution monitoring points, nature of pollutants and a pollution degree in the pollution information, and establishing a groundwater pollution early-warning grade evaluation matrix;

Step 303: establishing an enterprise pollution early-warning grade evaluation matrix according to soil and groundwater pollution early-warning grades of all monitoring points in the enterprise; and establishing a park pollution early-warning grade matrix according to the number and position distribution of all monitoring points in the park and the pollution early-warning grade of each monitoring point; and Step 304: implementing corresponding measures according to the early-warning grade of the pollution status in the park.

In one embodiment, in Step 301, the soil pollution status according to the positions of the soil pollution monitoring points, the nature of pollutants and the pollution degree in the pollution information is evaluated, and the soil pollution early-warning grade evaluation matrix is established.

Specifically, an early-warning grade evaluation matrix is established according to the toxicity of the pollutants, the pollution degree, the number and the positions of pollution points. Pollutants are first classified according to the relative positions between soil pollution points and the pollution sources, enterprise boundaries and park boundaries; second, the pollutants are classified according to the toxicity and non-toxicity of the pollutants; third, the pollutants are classified according to whether pollution is detected, whether the pollution degree exceeds the standard and an evolution trend of the pollutants, wherein different classifications correspond to different pollution early-warning grades.

The pollution early-warning grades comprise a no-early-warning grade, a low-early-warning grade, a lower-early-warning grade, a medium-early-warning grade, a high-early-warning grade, a higher-early-warning grade and an extremely high-early-warning grade. The soil pollution early-warning grade of a single point is evaluated by first determining an early-warning grade $L_i$ of all soil pollutants $[a_1, a_2, \ldots, a_n]$ at the point to form a set: $L=\{L_1, L_2, \ldots, L_n\}$ and ranking the set, taking a highest early-warning grade as the soil pollution early-warning grade at the point. The soil pollution early-warning grades at all monitoring points in the park are evaluated according to the same method.

In one embodiment, in Step 302, the groundwater pollution status is evaluated according to the positions of the groundwater pollution monitoring points, the nature of the pollutants and the pollution degree in the pollution information, and the groundwater pollution early-warning grade evaluation matrix is established.

Specifically, an early-warning grade evaluation matrix is established according to the toxicity, the pollution degree, the number and the positions of pollution points. The pollutants are first classified according to the relative positions between groundwater pollution points and the pollution sources, enterprise boundaries and park boundaries; second, the pollutants are classified according to the toxicity and non-toxicity of the pollutants; third, the pollutants are classified according to whether pollution is detected, whether the pollution degree exceeds the standard and an evolution trend of the pollutants. Different classifications correspond to different pollution early-warning grades.

The pollution early-warning grades comprise a no-early-warning grade, a low-early-warning grade, a lower-early-warning grade, a medium-early-warning grade, a high-early-warning grade, a higher-early-warning grade and an extremely high-early-warning grade. The groundwater pollution early-warning grade of a single point is evaluated by first determining an early-warning grade $H_i$ of each of all pollutants $[b_1, b_2, \ldots, b_n]$ at the point to form a set: $H=\{H_1, H_2, \ldots, H_n\}$ and ranking the set, taking the highest early-warning grade as the groundwater pollution early-warning grade at the point. The groundwater pollution early-warning grades are evaluated at all monitoring points in the park according to the same method.

In one embodiment, in Step 303, an enterprise pollution early-warning grade evaluation matrix is established according to the soil and groundwater pollution early-warning grade of all monitoring points in the enterprise.

Specifically, for all the soil and groundwater monitoring points in the enterprise, first, the soil pollution early-warning grade and the groundwater pollution early-warning grade of each monitoring point is determined; second, the soil pollution early-warning grades and the groundwater pollution grades of all monitoring points are ranked, and the highest grade is taken as the soil and groundwater pollution early-warning grade in the enterprise; third, the enterprise pollution early-warning grade evaluation matrix is constructed according to the classification of the soil and groundwater pollution early-warning grade in the enterprise. The first classification scenario is that there are no soil pollution points or groundwater pollution points inside the enterprise; the second classification scenario is that there are only soil pollution points or groundwater pollution points; the third classification scenario is that there are soil pollution points and groundwater pollution points at the same time. The enterprise pollution early-warning grades are divided into seven early-warning grades: no early-warning, low early-warning, lower early-warning, medium early-warning, high early-warning, higher early-warning and extremely high early-warning.

In one embodiment, in Step 303, the park pollution early-warning grade matrix is established according to the number and the position distribution of all monitoring points in the park and the pollution early-warning grade of each monitoring point.

Specifically, first, according to the positions of pollution points in the industrial park, the pollution points are dividing into two categories: pollution points inside the park but not at the boundary and pollution points at the boundary of the park. Second, an early-warning evaluation matrix is constructed according to the pollution early-warning grades and the number of all pollution points. Third, a comprehensive early-warning grade quantitative evaluation model is constructed.

Comprehensively analyzing the number and position distribution of all monitoring points in the park and the pollution early-warning grade of each monitoring point to determine a park early-warning grade comprises: first, dividing all monitoring points in the park into two classes, wherein Class A comprises points not more than 500 m away from the park boundary, and Class B comprises points more than 500 m away from the park boundary; secondly, according to the number and the pollution early-warning grade classification of monitoring points $k_i$ at the industrial park boundary of Class A determining a pollution early-warning grade "a" at the park boundary; thirdly, according to the number and the pollution early-warning grade classification of monitoring points $n_i$ inside the park of Class B to determine a pollution early-warning grade "b" inside the park; and fourthly, taking the highest grade of "a" and "b" as the park early-warning grade.

In one embodiment, determining the pollution early-warning grade "a" at the park boundary specifically comprises:

analyzing the early-warning grades of the monitoring points of Class A, and assigning no early-warning 2, low early-warning 6, lower early-warning 10, medium early-warning 16, higher early-warning 20, high early-warning 30, and extremely high early-warning 40; according to the number of monitoring points $k_i$ at the industrial park boundary of Class A, the number of no early-warning points $k_1$, the number of low early-warning points $k_2$, the number of lower early-warning points $k_3$, the number of medium early-warning points $k_4$, the number of higher early-warning points $k_5$, the number of high early-warning points $k_6$, and the number of extremely high early-warning points $k_7$, defining the total number of monitoring points of Class A as K, that is, $$K = \sum_{k=1}^{7} ki,$$

and obtaining a pollution early-warning score G of the monitoring points of Class A according to the following formula:

$$G = 2 \times k_1 + 6 \times k_2 + 10 \times k_3 + 16 \times k_4 + 20 \times k_5 + 30 \times k_6 + 40 \times k_7;$$
and defining the pollution early-warning grade of the monitoring points of Class A as the grade "a" based on the assignment of different grades, using the early-warning interval index mapping deformation method for partition, where $2K \leq G < (137K/49)$ corresponds to no early-warning, $(137K/49) \leq G < (250k/49)$ corresponds to low early-warning, $(250k/49) \leq G < (440k/49)$ corresponds to lower early-warning, $(440k/49) \leq G < (706k/49)$ corresponds to medium early-warning, $(706k/49) \leq G < (1049k/49)$ corresponds to higher early-warning, $(1049k/49) \leq G < (1466k/49)$ corresponds to high early-warning, and $(1466k/49) \leq G < 40k$ corresponds to extremely high early-warning.

Determining the pollution early-warning grade "b" inside the park specifically comprises:

analyzing the early-warning grades of the monitoring points of Class B, and assigning no early-warning 1, low early-warning 3, lower early-warning 5, medium early-warning 8, higher early-warning 10, high early-warning 15, and extremely high early-warning 20; according to the number of and the pollution early-warning grade classification of monitoring points $n_i$ inside the park of Class B, the number of no early-warning points $n_1$, the number of low early-warning points $n_2$, the number of lower early-warning points $n_3$, the number of medium early-warning points $n_4$, the number of higher early-warning points $n_5$, the number of high early-warning points $n_6$, and the number of extremely high early-warning points $n_7$, defining the total number of monitoring points inside the park as N, that is, $$N = \sum_{k=1}^{7} ni,$$

and obtaining a pollution early-warning score S of monitoring points of Class B according to the following formula:

$$S = 1 \times n_1 + 3 \times n_2 + 5 \times n_3 + 8 \times n_4 + 10 \times n_5 + 15 \times n_6 + 20 \times n_7; \text{ and}$$

defining the pollution early-warning grade of the monitoring points of Class B as grade "b" based on the assignment of different grades, using the early-warning interval index mapping deformation method for partition, where $N \leq S < (68N/49)$ corresponds to no early-warning, $(68N/49) \leq S < (125N/49)$ corresponds to low early-warning, $(125N/49) \leq S < (220N/49)$ corresponds to lower early-warning, $(220N/49) \leq S < (353N/49)$ corresponds to medium early-warning, $(353N/49) \leq S <$ $(524N/49)$ corresponds to higher early-warning, $(524N/49) \leq S < (733N/49)$ corresponds to high early-warning, and $(733N/49) \leq S \leq 20N$ corresponds to extremely high early-warning.

According to the specific embodiment provided by the present disclosure, the present disclosure discloses the following technical effects: a method of monitoring, evaluating and early-warning soil and groundwater pollution in an industrial park provided by the present disclosure provides a reference for pollution control in chemical industrial parks. The method comprises providing monitoring points and multi-index on-line monitoring devices for the key pollution sources in the industrial park, specifically including a sensor array, an on-line monitoring device, a data wireless transmission system and a PC terminal; monitoring the pollution status of soil, soil gas and groundwater; and collecting pollution-related data information for subsequent evaluation and early-warning. The method comprises establishing a groundwater pollution risk evaluating method based on the pollution source load risk, the potential hazard of pollution sources and the groundwater vulnerability according to the information about key pollution sources and hydrogeology in the industrial park. The method includes establishing an enterprise and park pollution early-warning evaluating method based on the pollution status of soil and groundwater according to the data of a soil and groundwater pollution monitoring system in the industrial park.

BRIEF DESCRIPTION OF THE DRAWINGS

In order to explain the embodiments of the present disclosure or the technical schemes in the prior art more clearly, the drawings that need to be used in the embodiments will be briefly introduced hereinafter. Obviously, the drawings in the following description are only some embodiments of the present disclosure. For those skilled in the art, other drawings can be obtained according to these drawings without any creative efforts.

FIG. 1 is a flow schematic diagram of a method of monitoring, evaluating and early-warning soil and groundwater pollution in an industrial park according to an embodiment of the present disclosure.

DETAILED DESCRIPTION OF THE EMBODIMENTS

The technical schemes in the embodiments of the present disclosure will be clearly and completely described below in combination with the drawings in the embodiments of the present disclosure. Obviously, the described embodiments are only part of the embodiments of the present disclosure, rather than all of the embodiments. Based on the embodiment of the present disclosure, all other embodiments obtained by those skilled in the art without any creative efforts fall within the scope of protection of the present disclosure.

The purpose of the present disclosure is to provide a method of monitoring, evaluating and early-warning soil and groundwater pollution in an industrial park, which can monitor, evaluate and early warn the key pollution of the producing enterprises in the industrial parks, thereby providing references for pollution control in chemical industrial parks and groundwater pollution control.

In order to make the above objectives, features and advantages of the present disclosure more obvious and understandable, the present disclosure will be illustrated in further detail below in combination with the drawings and detailed description.

As shown in FIG. 1, the present disclosure further provides a method of monitoring, evaluating and early-warning soil and groundwater pollution in an industrial park, comprising the following steps:

Step 1: for the key pollution sources in the industrial park, monitoring pollution status of soil, soil gas and groundwater by providing multi-index on-line monitoring points and devices, and collecting pollution-related data information;

Step 2: establishing a groundwater pollution risk evaluating method based on pollution source load risk, potential hazard of pollution sources and groundwater vulnerability according to the information about key pollution sources and hydrogeology in the industrial park; and Step 3: establishing an enterprise and park pollution early-warning evaluating method based on the pollution status of soil and groundwater according to the data from a soil and groundwater pollution monitoring system in the industrial park.

Figure 2:
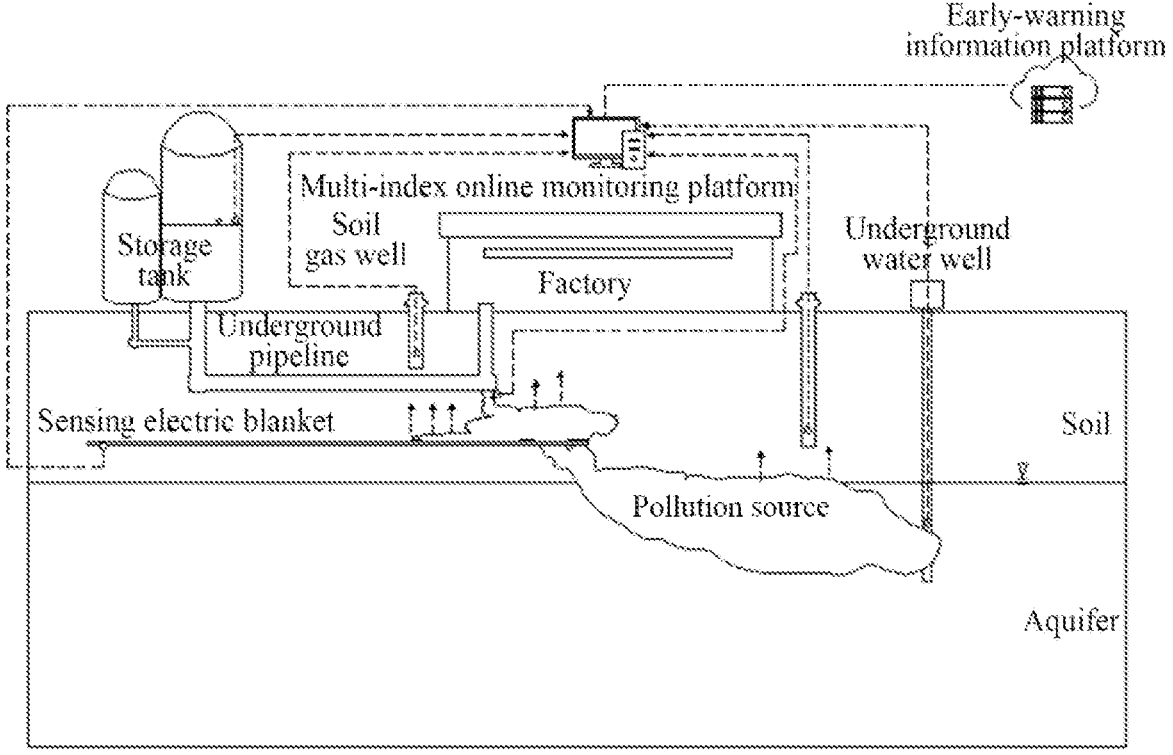
FIG. 2 is a conceptual diagram of a multi-index monitoring system for key pollution sources in an industrial park.

As shown in FIG. 2, in Step 1, the multi-index monitoring system for soil and groundwater pollution in the park provided by one embodiment of the present disclosure comprises a sensor array, an on-line monitoring device, a data wireless transmission system and a PC terminal. A plurality of groups of sensor arrays are respectively provided at monitoring points in the downstream direction of groundwater which are no more than 50 m and no more than 500 m around key pollution sources of the producing enterprises in the park. The sensor array is connected with the on-line monitoring device. The on-line monitoring device is communicatively connected with the PC terminal through the data wireless transmission system. The sensor array is used for pollution status information data of soil, soil gas and groundwater.

The sensor array comprises a liquid level sensor, a soil sensor array and a groundwater sensor array, where the liquid level sensor monitors seepage and leakage sources of storage tanks and pipelines, and feeds back whether seepage or leakage occurs through change of the liquid surface.

The soil sensor array comprises a liquid leakage sensor, which is configured to realize liquid leakage alarm and liquid leakage position and comprises a liquid leakage sensing cable (electric blanket), a soil conductivity sensor, and a resistance sensor. The sensing cable (electric blanket) is configured to detect liquid leakage at any position along the cable or electric blanket, and has obvious effect on hydrophobic organic pollutants such as gasoline, diesel oil, lubricating oil and chlorinated hydrocarbon organic solvents. The soil conductivity sensor and the resistance sensor can reflect the change of soil conductivity and resistivity resulted from liquid seepage and leakage pollution.

The groundwater sensor array comprises: a multi-parameter water quality sensor, which is configured to analyze and monitor four conventional parameters online, namely, groundwater temperature, oxidation-reduction potential, conductivity and water level, which can meet the requirements of on-line monitoring of inorganic substances, organic solvents and heavy metals in groundwater quality. An oil-water interface sensor uses an optical probe, which has industry-leading accuracy and can measure floating and sinking hydrocarbons and water.

An on-line monitoring device adopts gas chromatography of a photoionization detector for on-line detection and analysis of volatile organic pollutants in soil air and ambient air in key pollution sources, and is equipped with a multi-channel automatic sampling and switching system, including an automatic gas sampling pump, $C_{18}$ or TENAX sorbent tube, a pyrolysis and enrichment device for a sorbent tube. The detection limit and the accuracy meet the requirements of the relevant testing standards such as HJ/T75-2007, HJ/T76-2007, and HB/T9329-1999.

The wireless data transmission system comprises a data acquisition and caching device and a data wireless transmission device, where data is transmitted using Radio or GPRS, data is received by a mobile phone, IPAD and a PC remote terminal, and data can also be stored in a cloud storage mode.

Figure 3:
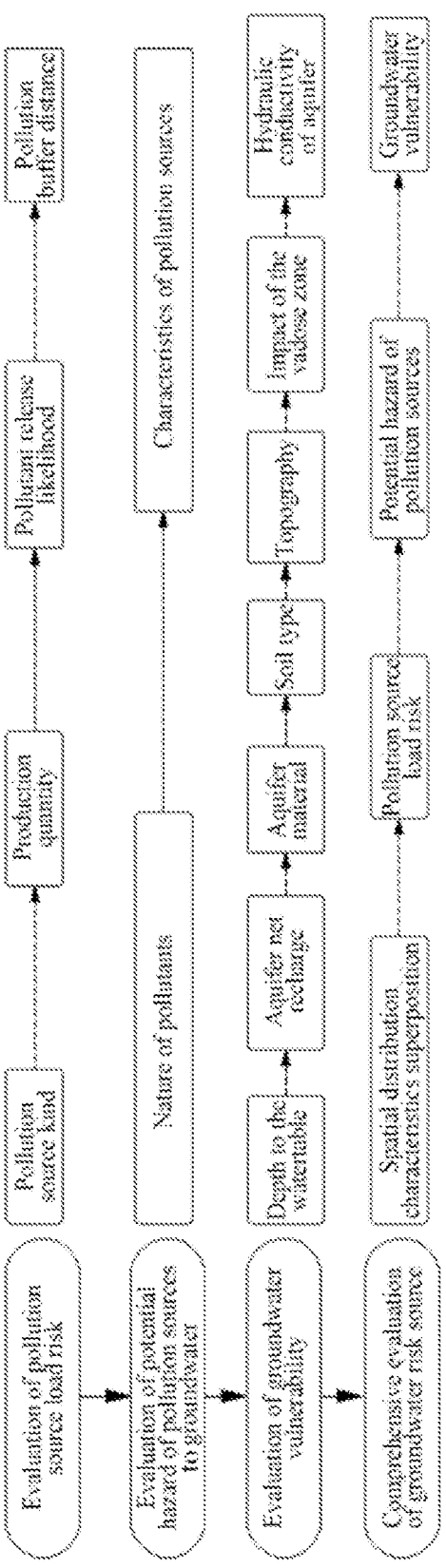
FIG. 3 is a flow chart of a method of evaluating a groundwater pollution risk according to pollution information.

As shown in FIG. 3, in Step 2, the groundwater pollution risk is evaluated according to pollution information, which specifically comprises the following steps.

In Step 2, establishing the groundwater pollution risk evaluating method based on pollution source load risk, potential hazard of pollution sources and groundwater vulnerability according to the information about key pollution sources and hydrogeology in the industrial park, specifically comprises steps 201-204.

In Step 201, the pollution source load risk is evaluated according to the pollution source kind, the pollutant production quantity, the pollutant release likelihood and the pollution buffer distance in the pollution information.

Specifically, the pollution source kind K, the pollutant production quantity Q, the pollutant release likelihood L and the pollution buffer distance D are acquired. The pollution source kind is divided into industrial pollution sources and other types of pollution sources, which is specifically divided into petrochemical engineering, coking, chemical raw materials and chemicals manufacturing, electroplating, nonferrous metal smelting, ferrous metal smelting, leather making, paper making, metal product manufacturing, textiles and hazardous waste disposal sites without lining protection, hazardous waste storage sites without lining protection, gas stations, petroleum product storage areas, general waste disposal sites without lining protection, general waste landfill sites without lining protection, general waste landfill sites with high groundwater level, and general waste landfill sites in valleys with low groundwater level. The pollution source kind K and the pollution buffer distance D are classified, graded, and assigned, as shown in Table 1.

The pollutant production quantity Q is classified and graded according to the discharge amount of wastewater of industrial sources, the disposal amount of waste disposal sites, the landfill amount of landfill sites, and the number of oil tanks in gas stations and petroleum product storage areas. The assignment range of the pollutant production quantity Q is between 1 and 12. The specific assignment is shown in Table 2.

The pollutant release likelihood L comprises a pollutant release likelihood $L_1$ and a likelihood of pollutant reaching groundwater $L_2$, which mainly considers the pollutant type (whether it is easy to migrate or not), pollution history, and protective measures (anti-leakage situations of production facilities, management degree for evaporating, emitting, dripping or leaking of liquid or gas). L is a sum of $L_1$ and $L_2$. The pollutant release likelihood $L_1$ is graded and assigned from 0.1 to 1.0 according to industrial sources, waste disposal sites, landfill sites, gas stations, petroleum product storage areas, pollution historical and protective measures. The specific assignment is shown in Table 3.

The likelihood of pollutant reaching groundwater $L_2$ is graded and respectively assigned as 1.0, 0.9, 0.8, 0.6, 0.4, 0.2 according to inorganic salt ions, hexavalent chromium, chlorinated hydrocarbons, benzene series, metal ions and other hydrophobic organic substances.

The calculation formula of a load risk index of a single pollution source is:

$$P = K*Q*L*D.$$

TABLE 1 grading table of pollution source kind K value
and the pollution buffer distance D value

| K | Industrial pollution sources | Other types of pollution sources | Pollution buffer distance D |
|---|---|---|---|
| 9 | Petrochemical engineering, coking | Hazardous waste disposal sites without lining protection | 2 |
| 8 | Chemical raw materials and chemicals manufacturing, electroplating | Hazardous waste storage sites without lining protection | 2 |
| 7 | Nonferrous metal smelting | Gas stations, petroleum product storage areas | 1.5 |
| 6 | Ferrous metal smelting | General waste disposal sites without lining protection | 1 |
| 5 | Leather making, paper making | General waste landfill sites without lining protection | 1.5 |
| 4 | Metal product manufacturing | General waste landfill sites with high groundwater level | 0.5 |
| 3 | Textiles | | 1 |
| 2 | Food | | 0.5 |
| 1 | Other industries | General waste landfill sites in valleys with low groundwater level | 0.5 |

TABLE 2 grading table of pollutant production quantity Q value

| Pollution sources | Type | Pollutant production quantity Q value |
|---|---|---|
| Industry (wastewater discharge ×10³ t/a) | ≤1 | 1 |
| | (1~5] | 2 |
| | (5~10] | 4 |
| | (10~50] | 6 |
| | (50~100] | 8 |
| | (100~500] | 10 |
| | >500 | 12 |
| Waste disposal site (disposal amount ×10³ t/a) | ≤1 | 2 |
| | (1~10] | 4 |
| | (10~50] | 7 |
| | (50~100] | 9 |
| | >100 | 12 |
| Landfill site (landfill amount ×10³ m³) | ≤1000 | 4 |
| | (1000~5000] | 7 |
| | >5000 | 9 |
| Gas station, petroleum product storage area (each oil tank has a capacity ≥30 m³) | 1 | 1 |
| | (1~10] | 3 |
| | (10~50] | 7 |
| | (50~100] | 9 |
| | >100 | 12 |

TABLE 3 grading table of pollution release likelihood $L_1$

| Pollution sources | Release likelihood | Pollution release likelihood $L_1$ |
|---|---|---|
| Industry | The factory was built after 2011. | 0.2 |
| | The factory was built from 1998 to 2011. | 0.6 |
| | The factory was built before 1998 or without protective measures. | 1 |
| Waste disposal site | Formal hazardous waste disposal site | 0.4 |
| | hazardous waste disposal site without protective measures | 1 |
| | Formal general waste disposal site | 0.1 |
| | General waste disposal site without protective measures | 0.2 |
| Landfill | ≤5 years, and formal grade I | 0.1 |

TABLE 3-continued grading table of pollution release likelihood $L_1$

| Pollution sources | Release likelihood | Pollution release likelihood $L_1$ |
|---|---|---|
| site | >5 years, and formal grade I | 0.2 |
| | ≤5 years, and formal grade II | 0.3 |
| | >5 years, and formal grade II | 0.4 |
| | ≤5 years, and formal grade III | 0.5 |
| | >5 years, and formal grade III | 0.6 |
| | Informal and simple-protective grade IV | 0.8 |
| | Informal and non-protection grade IV | 1.0 |
| Gas station, petroleum product storage area | ≤5 years, double-layer tank or anti-seepage pool | 0.1 |
| | (5 to 15) years, double-layer tank or anti-seepage pool | 0.2 |
| | >15 years, double-layer tank or anti-seepage pool | 0.5 |
| | ≤5 years, single-layer tank and anti-seepage pool | 0.3 |
| | (5 to 15) years, single-layer tank and anti-seepage pool | 0.6 |
| | (5 to 15) years, single-layer tank and no anti-seepage pool | 0.8 |
| | >15 years, single-layer tank and no anti-seepage pool | 1.0 |

The comprehensive load index of pollution sources is divided into five grades, where the specific load risk classification grades of pollution sources are shown in Table 4:

TABLE 4 classification standard of pollution source load risk

| | Pollution source load risk index | | | | |
|---|---|---|---|---|---|
| | [0-20] | (20-40] | (40-60] | (60-80] | (80-200] |
| P | low | lower | medium | higher | high |

In Step 202, the potential hazard of pollution sources is evaluated, which specifically comprises: acquiring an evaluation calculating formula and a parameter index system of potential hazard of pollution sources, where the specific parameters are shown in Table 5, and all the parameter grades range from 1 to 10. The specific division is shown in Table 6. The higher the grade, the greater the hazard to groundwater.

TABLE 5 potential hazard parameters of pollution sources

| Overall index | First-grade index A | Second-grade index B |
|---|---|---|
| Potential hazard index of pollution source | Nature of pollutant | Toxicity mobility Persistence Equal standard load |
| | Characteristics of pollutant | Discharge position Pollution occurrence probability Affected area Pollution duration |

TABLE 6 evaluation parameters and classification of potential hazard of pollution sources

| Toxicity | Grade | Mobility | Grade | Persistence | Grade | Equal standard load | Grade | Discharge position |
|---|---|---|---|---|---|---|---|---|
| ND | 1 | $K_{OC} > 2000$ | 2 | ≤15 d | 1 | <1 | 2 | |
| D | 2.5 | $500 < K_{OC} \leq 2000$ | 4 | 15~60 d | 3 | 1~10 | 4 | Surface |
| C | 5 | $150 < K_{OC} \leq 500$ | 6 | 60~180 d | 7 | 10~100 | 6 | |
| B | 7.5 | $50 < K_{OC} \leq 150$ | 8 | 180~360 d | 8 | 100~1000 | 8 | |
| A | 10 | $K_{OC} \leq 50$ | 10 | 360~720 d >720 d | 9 10 | >1000 | 10 | Underground |

| | Toxicity | Grade | Pollution occurrence probability | Grade | Affected area | Grade | Duration | Grade |
|---|---|---|---|---|---|---|---|---|
| | ND | | Sealing | 1 | <0.1 | 2.5 | Hours | 2 |
| | D | 2.5 | | | 0.1%~1% | 5 | Days | 4 |
| | C | | Partially sealing | 5 | 1%~10% | 7.5 | Months | 6 |
| | B | | | | 10%~100% | 5 | Years | 8 |
| | A | 10 | Exposure | 10 | | | Decades | 10 |

The potential hazard of pollution sources is evaluated according to the evaluation parameter index system of potential hazard of pollution sources, that is, the potential hazard index of pollution sources is calculated as follows:

$$S_j = \sum_{i=1}^{n} C_{ij} \times Q_{ij},$$

$$C_{ij} = T_{ij}W_T + M_{ij}W_M + D_{ij}W_D + L_{ij}W_L + S_{ij}W_S + P_{ij}W_P + A_{ij}W_A + C_{ij}W_C,$$

where $S_j$ is quantitative characterization of pollution ability of a pollution source j to groundwater pollution, namely hazard of the pollution source, $C_{ij}$ is quantitative characterization of eight self-attributes of the i-th characteristic pollutant of the pollution source j, namely hazard of the characteristic pollutant, $Q_{ij}$ denotes the quantity of the i-th pollutant discharged by risk source j entering the groundwater environment, namely the discharge amount. $T_{ij}$, $M_{ij}$, $D_{ij}$, $L_{ij}$, $S_{ij}$, $P_{ij}$, $A_{ij}$, $C_{ij}$ are quantitative indexes of toxicity, mobility, degradability, equal standard load, discharge position, pollution occurrence probability, affected area and duration of the i-th characteristic pollutant of the pollution source j, respectively. $W_T$, $W_M$, $W_D$, $W_L$, $W_S$, $W_P$, $W_A$. We are weight values of toxicity, mobility, degradability, equal standard load, discharge position, pollution occurrence probability, affected area and duration.

The weight of potential hazard parameters of the pollution sources is determined by an analytic hierarchy process, and the specific values are shown in Table 7.

According to the research emphasis, the weights of the eight attributes are determined, and the characteristic pollutants of the pollution sources to be evaluated are screened out. On this basis, the quantitative indexes of the eight attributes are determined, so that the quantification of the characteristic pollutants and the hazard quantification of the pollution sources can be carried out according to the above formula.

Step 203: groundwater vulnerability is evaluated according to depth to the watertable, aquifer net recharge, aquifer material, soil type, topography, impact of the vadose zone and hydraulic conductivity of aquifer in pollution information.

Specifically, groundwater vulnerability evaluation indexes are acquired. Seven hydrogeological parameter evaluation indexes corresponding to the DRASTIC vulnerability index are: depth to the watertable (D), aquifer net recharge (R), aquifer material (A), soil type(S), topography (T), impact of the vadose zone (I), hydraulic conductivity of aquifer (C). According to the Guide for Groundwater Vulnerability Evaluating and Mapping jointly compiled by the Groundwater Protection Committee of the International Association of Hydrologists and UNESCO, the grade range of each parameter in the DRASTIC method is from 1 to 10. The higher the grade value, the worse the groundwater protection ability and the easier it is to be polluted. Refer to Table 8 for the specific grade division of each parameter.

TABLE 7 weight of potential hazard parameters of pollution sources

| Indexes | Toxicity | Mobility | Persistence | Discharge position | Equal standard | Affected area | Pollution occurrence probability | Duration |
|---|---|---|---|---|---|---|---|---|
| weight | 0.2650 | 0.1325 | 0.1325 | 0.1100 | 0.1943 | 0.0957 | 0.0350 | 0.0350 |

TABLE 8

| grade values of each parameter in the DRASTIC method | | | | | | |
|---|---|---|---|---|---|---|
| D (m) | Grade | R (mm) | Grade | A | Grade | S |
| 0~1.5 | 10 | 0~50.8 | 1 | Massive shale | 1~3(2) | Thin layer of missing |
| 1.5~4.6 | 9 | 50.8~101.6 | 3 | Metamorphic rock, igneous rock | 2~5(3) | Gravel |
| 4.6~9.1 | 7 | 101.6~177.8 | 6 | Weathered metamorphic rock, igneous rock | 3~5(4) | Sand |
| 9.1~15.2 | 5 | 177.8~254.0 | 8 | Thin-bedded sandstone, limestone and shale | 5~9(6) | Swell-shrink clay |
| 15.2~22.9 | 3 | >54.0 | 9 | Massive sandstone | 4~9(6) | Sandy loam |
| 22.9~30.5 | 2 | — | — | Massive limestone | 4~9(6) | Loam |
| >30.5 | 1 | — | — | Sandy gravel | 6~9(8) | Silty loam |
| — | — | — | — | Basalt | 2~10(9) | Clay loam |
| — | — | — | — | Karst developed limestone | 9~10(10) | Non-swell-shrink clay |
| — | — | — | — | — | — | — |

| Grade | T (%) | Grade | I | Grade | C (m/d) | Grade |
|---|---|---|---|---|---|---|
| 10 | 0~2 | 10 | Silt/clay | 1~2(1) | 0.04~4.1 | 1 |
| 10 | 2~6 | 9 | Shale | 2~5(3) | 4.1~12.2 | 2 |
| 9 | 6~12 | 5 | limestone | 2~7(6) | 12.2~28.5 | 4 |
| 7 | 12~18 | 3 | Sandstone | 4~8(6) | 28.5~40.7 | 6 |
| 6 | >18 | 1 | Layered limestone, sandstone and shale | 4~8(6) | 40.7~81.5 | 8 |
| 5 | — | — | Sandy gravel containing more silt and clay | 4~8(6) | >81.5 | 10 |
| 4 | — | — | Metamorphic rock and igneous rock | 2~8(4) | — | — |
| 3 | — | — | Sandy gravel | 6~9(8) | — | — |
| 1 | — | — | Basalt | 2~10(9) | — | — |
| — | — | — | Karst developed limestone | 8~10(10) | — | — |

The DRASTIC method is used for calculation to obtain the vulnerability indexes:

$$DRASTIC=0.22\times D+0.17\times R+0.13\times A+0.09\times S+0.04\times T+0.22\times I+0.13\times C.$$

The calculated vulnerability indexes are graded as shown in Table 9:

TABLE 9

| grading of groundwater vulnerability indexes | |
|---|---|
| Groundwater vulnerability index | Grade |
| 20~70 | Low vulnerability |
| 70~100 | Lower vulnerability |
| 100~120 | Medium vulnerability |
| 120~150 | High vulnerability |
| 150~200 | Higher vulnerability |

In Step 204, the groundwater pollution risk is evaluated according to the pollution source load risk, the potential hazard of the pollution sources and the groundwater vulnerability. The step specifically includes:

comprehensively evaluating the groundwater pollution risk of a single pollution source according to the load risk, potential hazard and groundwater vulnerability of the pollution source as follows:

$$R_i=S_i\times D_i\times P_i,$$

where $R_i$ is a comprehensive index of the groundwater pollution risk of the i-th pollution source, $S_i$ is a potential hazard index of the i-th pollution source, $D_i$ is a groundwater vulnerability index of the i-th pollution source, and $P_i$ is a load risk index of the i-th pollution source.

In Step 204, risk superposition of multiple pollution sources with different types is calculated using the function of a grid calculator in geographic information system (GIS), and the comprehensive index of the groundwater pollution risk of multiple pollution sources is calculated with the following formula:

$$R = \Sigma W_i \times R_i,$$

where R is the comprehensive index of the groundwater pollution risk of multiple pollution sources, $W_i$ is a weight of the i-th pollution source, $R_i$ is an index of the groundwater pollution risk of the i-th pollution source, and $W_i$ is classified, graded and assigned according to the pollution sources, as shown in Table 10:

TABLE 10

| | weight of index of groundwater pollution risk of pollution sources with different types | | | | | | | | |
|---|---|---|---|---|---|---|---|---|---|
| | Industrial sources | | | | | | | | |
| | Petrochemical engineering, | Nonferrous metal smelting, ferrous metal | | | | | | | Gas station and petroleum product storage areas |
| | coking, chemical raw | smelting, leather making, | | Waste disposal sites | | Landfill sites | | | Large-scale |
| indexes | materials and chemicals manufacturing, electroplating | paper making and metal product manufacturing | Textile, food and other types | Hazardous waste disposal sites | General waste disposal sites | Hazardous waste landfill sites | General waste landfill site | Gas stations | petroleum product storage areas |
| weight | 5 | 4 | 1 | 3 | 2 | 4 | 3 | 2 | 3 |

Figure 4:
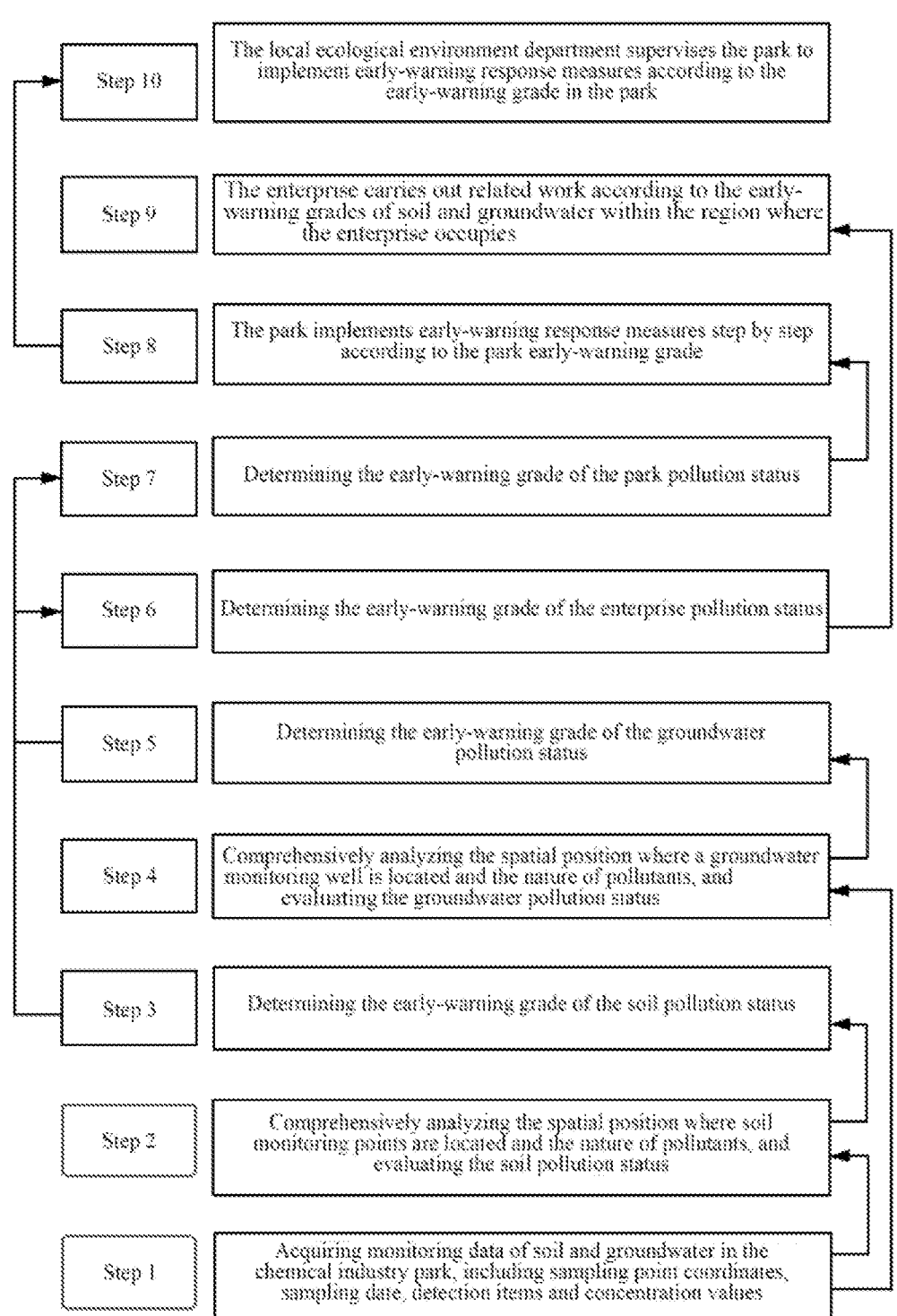
FIG. 4 is a flow chart of a method for pollution early-warning according to pollution information.

As shown in FIG. 4, in Step 3, the enterprise and park pollution early-warning evaluating method is established based on the pollution status of soil and groundwater according to the data of the soil and groundwater pollution monitoring system in the industrial park, which specifically comprises steps 301-304.

In Step 301: soil pollution status is evaluated according to positions of soil pollution monitoring points, nature of pollutants and pollution degree in the pollution information, and a soil pollution early-warning grade evaluation matrix is established.

Specifically, an early-warning grade evaluation matrix is established according to the toxicity, the pollution degree, the number and the positions of pollution points. First, pollutants are classified according to the relative positions between soil pollution points and pollution sources, enterprise boundaries and park boundaries; second, pollutants are classified according to the toxicity and non-toxicity of pollutants; third, pollutants are classified according to whether the pollution is detected, whether the pollution degree exceeds the standard and the evolution trend of pollutants, where different classifications correspond to different pollution early-warning grades.

The pollution early-warning grades comprise a no-early-warning grade, a low-early-warning grade, a lower-early-warning grade, a medium-early-warning grade, a high-earlywarning grade, a higher-early-warning grade and an extremely high-early-warning grade. A soil pollution early-warning grade of a single point is evaluated, for example, by: first, determining an early-warning grade $L_i$ of each of all soil pollutants $[a_1, a_2, \ldots, a_n]$ at the point to form a set $L = \{L_1, L_2, \ldots, L_n\}$ and rank the set, and taking the highest early-warning grade as the soil pollution early-warning grade at the point. The soil pollution early-warning grades at all monitoring points in the park are determined according to the same method. In one embodiment of the present disclosure, seven early-warning grades are set for soil pollution, including no early-warning, low early-warning, lower early-warning, medium early-warning, higher early-warning, high early-warning, and extremely high early-warning, respectively corresponding to green, cyan, blue, yellow, orange, red and brick red, as shown in Table 11.

The soil pollution status is directly related to the hazard of soil pollution and potential health risk, including the toxicity of pollutants detected in the soil and the status that pollution exceeds the standard. The present disclosure analyzes the type, number, times of exceeding the standard and pollution change trend of soil pollutants exceeding the standard with reference to "Soil environmental quality Risk control standard for soil contamination of development land" (GB36600-2018). The toxicity of pollutants is classified according to the toxicity score with reference to the toxicity database of "Pollutant Dictionary". The pollution change trend refers to the change trend of pollutant concentration and the change trend of pollution spatial position. If the pollutant concentration rises or the pollution migrates to the deep stratum, it is defined as deterioration of pollution trend; otherwise, it is defined as alleviation or remains unchanged, and no further classification is conducted.

TABLE 11

| | | | comparison table of soil pollution early-warning grades | | | | |
|---|---|---|---|---|---|---|---|
| | | Positions of monitoring points | | Pollution source | Factory boundary | Outside the factory and inside the park | Park boundary |
| | | Not detected | | Green | Green | Green | Green |
| Detected | Non-toxicity | Non-toxicity, no-standard, trend descending or remaining unchanged | | Cyan | Cyan | Cyan | Blue |

TABLE 11-continued

| | | Pollution source | Factory boundary | Outside the factory and inside the park | Park boundary |
| Positions of monitoring points | | | | | |
|---|---|---|---|---|---|
| | Non-toxicity, not exceed standard, trend descending or remaining unchanged | Cyan | Cyan | Cyan | Blue |
| | Non-toxicity, no-standard, trend ascending | Blue | Blue | Yellow | Yellow |
| | Non-toxicity, not exceeding standard, trend ascending | Blue | Blue | Yellow | Yellow |
| | Non-toxicity, exceeding standard, trend descending or remaining unchanged | Yellow | Yellow | Orange | Orange |
| | Non-toxicity, exceeding standard, trend ascending | Red | Red | Brick red | Brick red |
| Toxicity | Toxicity, no-standard, trend descending or remaining unchanged | Blue | Blue | Yellow | Yellow |
| | Toxicity, not exceeding standard, trend descending or remaining unchanged | Blue | Blue | Yellow | Yellow |
| | Toxicity, no-standard, trend ascending | Orange | Orange | Red | Red |
| | Toxicity, not exceeding standard, trend ascending | Orange | Orange | Red | Red |
| | Toxicity, exceeding standard, trend descending or remaining unchanged | Red | Red | Brick red | Brick red |
| | Toxicity, exceeding standard, trend ascending | Brick red | Brick red | Brick red | Brick red |

In Step 302, the groundwater pollution status is evaluated according to the positions of the groundwater pollution monitoring points, the nature of pollutants and the pollution degree in the pollution information, and a groundwater pollution early-warning grade evaluation matrix is established.

Specifically, an early-warning grade evaluation matrix is established according to the toxicity, the pollution degree, the number and the positions of pollution points. First, pollutants are classified according to the relative positions between groundwater pollution points and pollution sources, enterprise boundaries and park boundaries; second, pollutants are classified according to the toxicity and non-toxicity of pollutants; third, pollutants are classified according to whether the pollution is detected, whether the pollution degree exceeds the standard and the evolution trend of pollutants, where different classifications correspond to different pollution early-warning grades.

The pollution early-warning grades comprise a no-early-warning grade, a low-early-warning grade, a lower-early-warning grade, a medium-early-warning grade, a high-early-warning grade, a higher-early-warning grade and an extremely high-early-warning grade. A groundwater pollution early-warning grade of a single point is evaluated by first, determining an early-warning grade $H_i$ of each of all pollutants $[b_1, b_2, \ldots, b_n]$ at the point to form a set $H=\{H_1, H_2, \ldots, H_n\}$ and rank the set, and taking the highest early-warning grade as the groundwater pollution early-warning grade at the point. The groundwater pollution early-warning grades at all monitoring points in the park are determined according to the same method. In one embodiment of the present disclosure, it is determined that seven early-warning grades are set for groundwater pollution including no early-warning, low early-warning, lower early-warning, medium early-warning, higher early-warning, high early-warning, and extremely high early-warning respectively corresponding to green, cyan, blue, yellow, orange, red and brick red, as shown in Table 12.

As the groundwater pollution status is directly related to the hazard of groundwater pollution and potential health and ecological risk, including the toxicity of pollutants detected in the groundwater and the status that pollution exceeds the standard, the present disclosure analyzes the type, number, times of exceeding the standard and pollution change trend of groundwater pollutants exceeding the standard with reference to "Standard for Groundwater Quality" (GBT-14848-2017). The toxicity of pollutants is classified according to the toxicity score with reference to the toxicity database of "Pollutant Dictionary". The pollution change trend refers to the change trend of pollutant concentration and the change trend of pollution spatial position. If the pollutant concentration rises or the pollution vertically migrates to the deep groundwater, and the pollution horizontally spreads outward, it is defined as deterioration of pollution trend; otherwise, it is defined as alleviation or changelessness, and no further classification is conducted.

TABLE 12 comparison table of groundwater pollution early-warning grades

| Positions of monitoring points | | | Pollution source | Factory boundary | Outside the factory and inside the park | Park boundary |
|---|---|---|---|---|---|---|
| | | Not detected | Green | Green | Green | Green |
| Detected | Non-toxicity | Non-toxicity, no-standard, trend descending or remaining unchanged | Cyan | Cyan | Cyan | Blue |
| | | Non-toxicity, not exceed standard, trend descending or remaining unchanged | Cyan | Cyan | Cyan | Blue |
| | | Non-toxicity, no-standard, trend ascending | Blue | Blue | Yellow | Yellow |
| | | Non-toxicity, not exceeding standard, trend ascending | Blue | Blue | Yellow | Yellow |
| | | Non-toxicity, exceeding standard, trend descending or remaining unchanged | Yellow | Yellow | Orange | Orange |
| | | Non-toxicity, exceeding standard, trend ascending | Red | Red | Brick red | Brick red |
| | Toxicity | Toxicity, no-standard, trend descending or remaining unchanged | Blue | Blue | Yellow | Yellow |
| | | Toxicity, not exceeding standard, trend descending or remaining unchanged | Blue | Blue | Yellow | Yellow |
| | | Toxicity, no-standard, trend ascending | Orange | Orange | Red | Red |
| | | Toxicity, not exceeding standard, trend ascending | Orange | Orange | Red | Red |
| | | Toxicity, exceeding standard, trend descending or remaining unchanged | Red | Red | Brick red | Brick red |
| | | Toxicity, exceeding standard, trend ascending | Brick red | Brick red | Brick red | Brick red |

In Step 303, an enterprise pollution early-warning grade evaluation matrix is established according to the soil and groundwater pollution early-warning grades of all monitoring points in the enterprise.

Specifically, for all the soil and groundwater monitoring points in the enterprise, first, the soil pollution early-warning grade and the groundwater pollution early-warning grade of each monitoring point are determined; second, the soil pollution early-warning grades and the groundwater pollution grades of all monitoring points are ranked, and the highest grade is taken as the soil and groundwater pollution early-warning grade in the enterprise; third, the enterprise pollution early-warning grade evaluation matrix is constructed according to the classification of the soil and groundwater pollution early-warning grade in the enterprise. The first classification scenario is that there are no soil pollution points or groundwater pollution points inside the enterprise; the second classification scenario is that there are only soil pollution points or groundwater pollution points; and the third classification scenario is that there are soil pollution points and groundwater pollution points at the same time. The enterprise pollution early-warning grades are divided into seven early-warning grades including no early-warning, low early-warning, lower early-warning, medium early-warning, high early-warning, higher early-warning and extremely high early-warning respectively corresponding to green, cyan, blue, yellow, orange, red and brick red, as shown in Table 13:

TABLE 13 comparison table of enterprise pollution status early-warning grades

| Factor early-warning grade | | Soil monitoring point grade | | | | | | | | Notes: |
|---|---|---|---|---|---|---|---|---|---|---|
| | | Green | Cyan | Blue | Yellow | Orange | Red | Brick red | | |
| Groundwater | Green | Green | Cyan | Blue | Yellow | Orange | Red | Brick red | Green | No early-warning |
| monitoring | Cyan | Cyan | Blue | Yellow | Yellow | Orange | Red | Brick red | Cyan | Low |
| point | Blue | Blue | Blue | Yellow | Yellow | Orange | Red | Brick red | Blue | Lower |
| grade | Yellow | Yellow | Yellow | Yellow | Orange | Orange | Red | Brick red | Yellow | Medium |
| | Orange | Orange | Orange | Orange | Orange | Red | Red | Brick red | Orange | Higher |
| | Red | Red | Red | Red | Red | Red | Brick red | Brick red | Red | High |
| | Brick red | Brick red | Brick red | Brick red | Brick red | Brick red | Brick red | Brick red | Brick red | Extremely high |

In Step 303, the park pollution early-warning grade matrix is established according to the number and position distribution of all monitoring points in the park and the pollution early-warning grade of each monitoring point.

Specifically, first, according to the positions of pollution points in the industrial park, the pollution points are divided into two categories: pollution points inside the park but not at the boundary and pollution points at the boundary of the park; second, an early-warning evaluation matrix is constructed according to the pollution early-warning grades and the number of all points; and third, a comprehensive early-warning grade quantitative evaluation model is constructed.

Based on a comprehensive analysis of the number and position distribution of all monitoring points in the park and the pollution early-warning grade of each monitoring point, the park early-warning grade is determined. Firstly, all monitoring points in the park are divided into two classes, where Class A includes points not more than 500 m away from the park boundary, and Class B includes points more than 500 m away from the park boundary; secondly, according to the number of and the pollution early-warning grade classification of monitoring points $k_i$ at the industrial park boundary of Class A, the pollution early-warning grade "a" at the park boundary is determined; thirdly, according to the number of and the pollution early-warning grade classification of monitoring points $n_i$ inside the park of Class B, the points $k_2$, the number of lower early-warning points $k_3$, the number of medium early-warning points $k_4$, the number of higher early-warning points $k_5$, the number of high early-warning points $k_6$, and the number of extremely high early-warning points $k_7$, the total number of monitoring points of Class A is defined as K, that is, $$K = \sum_{k=1}^{7} ki.$$

The pollution early-warning score G of monitoring points of Class A is obtained according to the following formula:

$$G = 2 \times k_1 + 6 \times k_2 + 10 \times k_3 + 16 \times k_4 + 20 \times k_5 + 30 \times k_6 + 40 \times k_7.$$

Based on the assignment of different grades, the early-warning interval index mapping deformation method is used to partition, and the pollution early-warning grades of monitoring points of Class A are defined as grade "a", where $2K \leq G < (137K/49)$ corresponds to no early-warning, $(137K/49) \leq G < (250k/49)$ corresponds to low early-warning, $(250k/49) \leq G < (440k/49)$ corresponds to lower early-warning, $(440k/49) \leq G < (706k/49)$ corresponds to medium early-warning, $(706k/49) \leq G < (1049k/49)$ corresponds to higher early-warning, $(1049k/49) \leq G < (1466k/49)$ corresponds to high early-warning, and $(1466k/49) \leq G \leq 40k$ corresponds to extremely high early-warning.

TABLE 14

| pollution early-warning grade table of monitoring points of Class A in the industrial park | | | | | | |
|---|---|---|---|---|---|---|
| Factor | Grade of monitoring points of Class A | | | | | |
| characteristics | Green | Cyan | Blue | Yellow | Orange | Red |
| Assigned score | 2 | 6 | 10 | 16 | 20 | 30 |
| Number of corresponding monitoring points | k1 | k2 | k3 | k4 | k5 | k6 |
| Source calculation formula of Class A | G = 2 *k1 + 6*k2 + 10*k3 + 16*k4 + 20*k5 + 30*k6 + 40*k7 | | | | | |
| Score interval corresponding to early-warning grade | 2K ≤ G ≤ 137K/49 | 137K/49 ≤ G ≤ 250k/49 | 250k/49 ≤ G ≤ 440k/49 | 440k/49 ≤ G ≤ 706k/49 | 706k/49 ≤ G ≤ 1049k/49 | 1049k/49 ≤ G ≤ 1466k/49 |
| Early-warning grade "a" at the park boundary | Green | Cyan | Blue | Yellow | Orange | Red |

| Factor characteristics | Grade of monitoring points of Class A Brick red | Notes: | |
|---|---|---|---|
| Assigned score | 40 | Green | No early-warning |
| Number of corresponding monitoring points | k7 | Cyan | Low |
| | | Blue | Lower |
| Source calculation formula of Class A | G = 2 *k1 + 6*k2 + 10*k3 + 16*k4 + 20*k5 + 30*k6 + 40*k7 | Yellow | Medium |
| | | Orange | Higher |
| Score interval corresponding to early-warning grade | 1466k/49 ≤ G ≤ 40k | Red | High |
| | | Brick red | Extremely high |
| Early warning grade "a" at the park boundary | Brick red | | |

Note:
The total number of monitoring points of Class A is defined as K, and the score is G.

pollution early-warning grade "b" inside the park is determined; and fourthly, the highest grade of "a" and "b" is taken as the park early-warning grade.

As shown in Table 14, the early-warning grades of the monitoring points of Class A are analyzed, no early-warning is assigned 2, low early-warning is assigned 6, lower early-warning is assigned 10, medium early-warning is assigned 16, higher early-warning is assigned 20, high early-warning is assigned 30, and extremely high early-warning is assigned 40; according to the number of monitoring points $k_i$ at the industrial park boundary of Class A, the number of no early-warning points $k_1$, the number of low early-warning As shown in Table 15, the early-warning grades of the monitoring points of Class B are analyzed, and no early-warning is assigned 1, low early-warning is assigned 3, lower early-warning is assigned 5, medium early-warning is assigned 8, higher early-warning is assigned 10, high early-warning is assigned 15, and extremely high early-warning is assigned 20. According to the number of and the pollution early-warning grade classification of monitoring points $n_i$ inside the park of Class B, the number of no early-warning points $n_1$, the number of low early-warning points $n_2$, the number of lower early-warning points $n_3$, the number of medium early-warning points $n_4$, the number of higher early-warning points $n_5$, the number of high early-warning points $n_6$, and the number of extremely high early-warning points $n_7$, the total number of monitoring points inside the park is defined as N, that is, $$N = \sum_{i=1}^{7} ni.$$

The pollution early-warning score S of monitoring points of Class B is obtained according to the following formula:

$$S = 1 \times n_1 + 3 \times n_2 + 5 \times n_3 + 8 \times n_4 + 10 \times n_5 + 15 \times n_6 + 20 \times n_7.$$

Based on the assignment of different grades, the early-warning interval index mapping deformation method is used to partition, and the pollution early-warning grades of monitoring points of Class B are defined as grade "b", where $N \leq S < (68N/49)$ corresponds to no early-warning, $(68N/49) \leq S < (125N/49)$ corresponds to low early-warning, $(125N/49) \leq S < (220N/49)$ corresponds to lower early-warning, $(220N/49) \leq S < (353N/49)$ corresponds to medium early-warning, $(353N/49) \leq S < (524N/49)$ corresponds to higher early-warning, $(524N/49) \leq S < (733N/49)$ corresponds to high early-warning, and $(733N/49) \leq S \leq 20N$ corresponds to extremely high early-warning.

drinking water sources around the park, in addition to the above-mentioned work, a groundwater environment monitoring well should be arranged in the main groundwater flow direction between the park boundary and the water source extraction well for long-term monitoring according to HJ164-2020. Finally, the pollution early-warning grade is re-evaluated according to the control or remediation effect. If the pollution early-warning grade remains unchanged, the remediation or control scheme should be adjusted in time.

(2) In a case that the park early-warning grade is red, for the enterprises and surrounding areas with red and orange early-warning grades, detailed investigation and risk evaluation of soil and groundwater are carried out; pollution sources, types of pollutants, pollution status, spatial pollution distribution, pollution paths, sensitive receptors, pollution hazards and risks are found out; pollution remediation or risk control measures are started up for key areas to prevent pollution sources and pollution paths; and at the same time, the monitoring points and the monitoring frequency of soil and groundwater are increased. Finally, the pollution early-warning grade is re-evaluated according to the control or remediation effect. If the pollution early-warning grade remains unchanged, the remediation or control scheme should be adjusted in time. If the pollution grade is upgraded, the corresponding pollution early-warning measures should be started up.

TABLE 15

| pollution early-warning grade table of monitoring points of Class B in the industrial park | | | | | | |
|---|---|---|---|---|---|---|
| Factor characteristics | Grade of monitoring point of Class B | | | | | |
| | Green | Cyan | Blue | Yellow | Orange | Red |
| Assigned score | 1 | 3 | 5 | 8 | 10 | 15 |
| Number of corresponding monitoring points | n1 | n2 | n3 | n4 | n5 | n6 |
| Score calculation formula of Class B | S = 1*n1 + 3*n2 + 5*n3 + 8*n4 + 10*n5 + 15*n6 + 20*n7 | | | | | |
| Core interval corresponding to early-warning grade Early-warning grade "b" at the park boundary | N ≤ S ≤ 68N/49 | 68N/49 ≤ S ≤ 125N/49 | 125N/49 ≤ S ≤ 220N/49 | 220N/49 ≤ S ≤ 353N/49 | 353N/49 ≤ S ≤ 524N/49 | 524N/49 ≤ S ≤ 733N/49 |

| Factor characteristics | Grade of monitoring point of Class B Brick red | Notes: | |
|---|---|---|---|
| Assigned score | 20 | Green | No early-warning |
| Number of corresponding monitoring points | n7 | Cyan Blue | Low Lower |
| Score calculation formula of Class B | S = 1*n1 + 3*n2 + 5*n3 + 8*n4 + 10*n5 + 15*n6 + 20*n7 | Yellow Orange | Medium Higher |
| Core interval corresponding to early-warning grade Early-warning grade "b" at the park boundary | 733N/49 ≤ S ≤ 20N | Red Brick red | High Extremely high |

Note:
The total number of monitoring points of Class B is defined as N, and the score is S.

In Step 304, corresponding measures are specifically implemented according to the early-warning grade of pollution status in the park as follows.

(1) In a case that the park early-warning grade is brick red, for the enterprises and surrounding areas with brick red, red and orange early-warning grades, detailed investigation and risk evaluation of soil and groundwater are carried out; pollution sources, types of pollutants, pollution status, spatial pollution distribution, pollution paths, sensitive receptors, pollution hazards and risks are found out; pollution remediation or risk control measures are started up for key areas to stop pollution sources and pollution paths, control environmental risks of soil and groundwater pollution, and improve environmental quality of soil and groundwater; at the same time, the monitoring points and the monitoring frequency of soil and groundwater are increased. If there are (3) In a case that the park early-warning grade is orange, for the enterprises and surrounding areas with orange and yellow early-warning grades, detailed investigation and risk evaluation of soil and groundwater are carried out; pollution sources, types of pollutants, pollution status, spatial pollution distribution, pollution paths, sensitive receptors, pollution hazards and risks are found out; risk control is mainly used to prevent the pollution scope and the pollution degree from getting worse. If conditions permit, pollution remediation can be carried out for key areas; at the same time, the monitoring points and the monitoring frequency of soil and groundwater are increased. Finally, the pollution early-warning grade is re-evaluated according to the control effect. If the pollution early-warning grade remains unchanged, the remediation or control scheme should be adjusted in time. If the pollution grade is upgraded, the corresponding pollution early-warning measures should be started up.

In a case that the park early-warning grade is yellow, for the enterprises and surrounding areas with yellow and blue early-warning grades, the hidden dangers of soil and groundwater pollution are identified, and the pollution hidden dangers are found out, such that the rectification scheme is implemented to eliminate the hidden dangers. At the same time, the monitoring frequency of soil and groundwater is appropriately increased. The pollution early-warning grade is re-evaluated according to the monitoring data after the rectification of the pollution hidden dangers. If the pollution early-warning grade remains unchanged, the monitoring points and the monitoring frequency of soil and groundwater should be increased. If the pollution early-warning grade is upgraded, the corresponding pollution early-warning measures should be started up.

(5) In a case that the park early-warning grade is blue, for the enterprises and surrounding areas with blue early-warning grades, the hidden dangers of soil and groundwater pollution are identified, and the pollution hidden dangers are found out, such that the rectification scheme is implemented to eliminate the hidden dangers. At the same time, the monitoring frequency of soil and groundwater is appropriately increased. The pollution early-warning grade is re-evaluated according to the monitoring data after the rectification of the pollution hidden dangers. If the pollution early-warning grade remains unchanged, the monitoring points and the monitoring frequency of soil and groundwater should be increased. If the pollution early-warning grade is upgraded, the corresponding pollution early-warning measures should be started up.

(6) In the case that the park early-warning grade is cyan: long-term sampling monitoring should be carried out on the soil and groundwater in the park; and according to the monitoring results, the early-warning grade should be adjusted, and the corresponding early-warning countermeasures should be started up.

(7) In a case that the park early-warning grade is green, as green denotes no early-warning, daily management of the enterprises in the park is carried out, i.e., self-monitoring of the operating enterprises is carried out according to HJ1209.

In Step 304, response measures of classification and grading are implemented according to the early-warning grade of pollution status in the enterprise, specifically as follows.

(1) When the enterprise early-warning grade is brick red, detailed investigation and risk evaluation of soil and groundwater within the enterprise are immediately carried out, and pollution sources, types of pollutants, pollution status, spatial pollution distribution, and pollution paths are found out, such that pollution remediation or risk control measures may be started up for key areas to prevent pollution sources and pollution paths, control environmental risks of soil and groundwater pollution, and improve environmental quality of soil and groundwater. At the same time, the monitoring points and the monitoring frequency of soil and groundwater in the enterprises and surrounding areas are increased. The pollution early-warning grade is re-evaluated according to the control or remediation effect. If the pollution early-warning grade remains unchanged, and the pollution early-warning grade of soil and groundwater monitoring points around the enterprise is upgraded, the remediation or control scheme should be adjusted in time.

(2) When the enterprise early-warning grade is red, detailed investigation and risk evaluation of soil and groundwater within the enterprise are immediately carried out, and pollution sources, types of pollutants, pollution status, spatial pollution distribution, and pollution paths are found out, such that pollution remediation or risk control measures may be started up for key areas to prevent pollution sources and pollution paths, control environmental risks of soil and groundwater pollution, and improve environmental quality of soil and groundwater. At the same time, the monitoring points and the monitoring frequency of soil and groundwater in the enterprises and surrounding areas are increased. The pollution early-warning grade is re-evaluated according to the control or remediation effect. If the pollution early-warning grade remains unchanged, and the pollution early-warning grade of soil and groundwater monitoring points around the enterprise is upgraded, the remediation or control scheme should be adjusted in time. If the pollution early-warning grade is upgraded, the corresponding pollution early-warning measures should be started up.

(3) When the enterprise early-warning grade is orange or yellow, the hidden dangers of soil and groundwater pollution in the enterprise are immediately identified, and the pollution hidden dangers of environmental quality are found out, such that the rectification scheme is formulated to eliminate the hidden dangers. For the places and facilities where the pollution wind direction still exists after rectification, long-term monitoring of soil and groundwater is carried out according to HJ1209. The early-warning grade is re-evaluated according to the rectification effect. If the pollution early-warning grade remains unchanged, the monitoring points and the monitoring frequency of soil and groundwater should be increased. If the pollution early-warning grade is upgraded, the corresponding pollution early-warning measures should be started up.

(4) When the enterprise early-warning grade is blue or cyan, long-term sampling monitoring should be carried out on the soil and groundwater in the enterprise. According to the monitoring results, the early-warning grade should be adjusted, and the corresponding early-warning countermeasures should be started up.

(5) The enterprise early-warning grade is green: daily management of the enterprises is carried out, i.e., self-monitoring of the producing enterprises is carried out according to HJ1209.

In Step 304, the local ecological and environmental department supervises the implementation of early-warning response measures of the park according to the early-warning grade of the park.

The present disclosure provides a method of monitoring, evaluating and early-warning soil and groundwater pollution in an industrial park. The method comprises: for the key pollution sources in the industrial park, monitoring the pollution status of soil, soil gas and groundwater by providing multi-index on-line monitoring points and devices, and collecting pollution-related data information; establishing a groundwater pollution risk evaluating method based on the pollution source load risk, the potential hazard of pollution sources and the groundwater vulnerability according to the information about key pollution sources and hydrogeology in the industrial park; and establishing an enterprise and park pollution early-warning evaluating method based on the pollution status of soil and groundwater according to the data of a soil and groundwater pollution monitoring system in the industrial park. The present disclosure is in line with the environmental management solution that pollution prevention is the priority in an industrial park in China, which can grasp the soil and groundwater pollution status in an industrial park in time, efficiently judge the pollution evolution trend and effectively take pollution prevention measures. It is urgent to establish a method of monitoring, evaluating and early-warning soil and groundwater pollution in an industrial park, which will provide technical support for the management of soil and groundwater pollution prevention in the industrial park.

In the present disclosure, specific examples are used to explain the principle and implementation of the present disclosure, and the explanations of the above embodiments are only used to help understand the method and the core idea of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A method of monitoring, evaluating and early-warning soil and groundwater pollution in an industrial park, comprising:

Step 1: for the pollution sources in the industrial park, monitoring pollution status of soil, soil gas and groundwater by providing multi-index on-line monitoring points and devices, and collecting pollution-related data information;

Step 2: establishing a groundwater pollution risk evaluating method based on a pollution source load risk, potential hazard of pollution sources and groundwater vulnerability according to the information about pollution sources and hydrogeology in the industrial park;

Step 3: establishing an enterprise and park pollution early-warning evaluating method based on the pollution status of soil and groundwater according to data from a soil and groundwater pollution monitoring system in the industrial park;

step 4: obtaining a pollution early-warning evaluation result based on the groundwater pollution risk evaluating method and the enterprise and park pollution early-warning evaluating method; and step 5: determining a remediation scheme or a rectification scheme based on the pollution early-warning evaluation result, and sending the remediation scheme or the rectification scheme to an enterprise corresponding to the pollution early-warning evaluation result;

wherein in Step 3, establishing the enterprise and park pollution early-warning evaluating method based on the pollution status of soil and groundwater according to the data of the soil and groundwater pollution monitoring system in the industrial park, comprises:

Step 301, evaluating soil pollution status according to positions of soil pollution monitoring points, nature of pollutants and a pollution degree in the pollution information, and establishing a soil pollution early-warning grade evaluation matrix;

Step 302, evaluating groundwater pollution status according to positions of groundwater pollution monitoring points, nature of pollutants and a pollution degree in the pollution information, and establishing a groundwater pollution early-warning grade evaluation matrix;

Step 303: establishing an enterprise pollution early-warning grade evaluation matrix according to soil and groundwater pollution early-warning grades of all monitoring points in the enterprise; and establishing a park pollution early-warning grade matrix according to a number and a position distribution of all monitoring points in the park and the pollution early-warning grade of each monitoring point; and Step 304: implementing corresponding measures according to the early-warning grade of the pollution status in the park;

wherein in Step 301, evaluating the soil pollution status according to the positions of the soil pollution monitoring points, the nature of the pollutants and the pollution degree in the pollution information, and establishing the soil pollution early-warning grade evaluation matrix comprises:

establishing an early-warning grade evaluation matrix according to the toxicity of the pollutants, the pollution degree, the number and the positions of pollution points, wherein, pollutants are first classified according to the relative positions between soil pollution points and the pollution sources, enterprise boundaries and park boundaries; second, the pollutants are first classified according to the toxicity and non-toxicity of the pollutants; third, the pollutants are classified according to whether pollution is detected, whether the pollution degree exceeds the standard and an evolution trend of the pollutants, wherein different classifications correspond to different pollution early-warning grades;

wherein the pollution early-warning grades comprise a no-early-warning grade, a low-early-warning grade, a lower-early-warning grade, a medium-early-warning grade, a high-early-warning grade, a higher-early-warning grade and an extremely high-early-warning grade; a soil pollution early-warning grade of a single point is evaluated by first determining an early-warning grade $L_i$ of each of all soil pollutants $[a_1, a_2, \ldots, a_n]$ at the point to form a set $L=\{L_1, L_2, \ldots, L_n\}$ and ranking the set, taking a highest early-warning grade as the soil pollution early-warning grade at the point; and the soil pollution early-warning grades at all monitoring points in the park are evaluated according to the same method;

wherein in Step 302, evaluating the groundwater pollution status according to the positions of the groundwater pollution monitoring points, the nature of the pollutants and the pollution degree in the pollution information, and establishing the groundwater pollution early-warning grade evaluation matrix comprises:

establishing an early-warning grade evaluation matrix according to the toxicity, the pollution degree, the number and the positions of pollution points, wherein, the pollutants are classified according to the relative positions between groundwater pollution points and the pollution sources, enterprise boundaries and park boundaries; second, the pollutants are classified according to the toxicity and non-toxicity of the pollutants; third, the pollutants are classified according to whether pollution is detected, whether the pollution degree exceeds the standard and an evolution trend of the pollutants, wherein different classifications correspond to different pollution early-warning grades;

wherein the pollution early-warning grades comprise a no-early-warning grade, a low-early-warning grade, a lower-early-warning grade, a medium-early-warning grade, a high-early-warning grade, a higher-early-warning grade and an extremely high-early-warning grade; a groundwater pollution early-warning grade of a single point is evaluated by first, determining an early-warning grade $H_i$ of each of all pollutants $[b_1, b_2, \ldots, b_n]$ at the point to form a set $H=\{H_1, H_2, \ldots, H_n\}$ and ranking the set, taking a highest early-warning grade as the groundwater pollution early-warning grade at the point, and the groundwater pollution early-warning grades at all monitoring points in the park are evaluated according to the same method;

wherein in Step 303, establishing the enterprise pollution early-warning grade evaluation matrix according to the soil and groundwater pollution early-warning grades of all monitoring points in the enterprise, comprises:

for all the soil and groundwater monitoring points in the enterprise, first, determining the soil pollution early-warning grade and the groundwater pollution early-warning grade of each monitoring point; second, ranking the soil pollution early-warning grades and the groundwater pollution grades of all monitoring points, and taking a highest grade as the soil and groundwater pollution early-warning grade in the enterprise; third, constructing the enterprise pollution early-warning grade evaluation matrix according to the classification of the soil and groundwater pollution early-warning grade in the enterprise, wherein a first classification scenario is that there are no soil pollution points or groundwater pollution points inside the enterprise; a second classification scenario is that there are only soil pollution points or groundwater pollution points; a third classification scenario is that there are soil pollution points and groundwater pollution points at the same time; the enterprise pollution early-warning grades are divided into seven early-warning grades: no early-warning, low early-warning, lower early-warning, medium early-warning, high early-warning, higher early-warning and extremely high early-warning;

wherein in Step 303, establishing the park pollution early-warning grade matrix according to the number and the position distribution of all monitoring points in the park and the pollution early-warning grade of each monitoring point comprises:

first, according to the positions of the pollution points in the industrial park, dividing the pollution points into two categories: pollution points inside the park but not at the boundary and pollution points at the boundary of the park; second, constructing an early-warning evaluation matrix according to the pollution early-warning grades and the number of all pollution points; third, constructing a comprehensive early-warning grade quantitative evaluation model;

wherein comprehensively analyzing the number and position distribution of all monitoring points in the park and the pollution early-warning grade of each monitoring point to determine a park early-warning grade comprises: first, dividing all monitoring points in the park into two classes, wherein Class A comprises points not more than 500 m away from the park boundary, and Class B comprises points more than 500 m away from the park boundary; secondly, according to the number and the pollution early-warning grade classification of monitoring points $k_i$ at the industrial park boundary of Class A determining a pollution early-warning grade "a" at the park boundary; thirdly, according to the number and the pollution early-warning grade classification of monitoring points $n_i$ inside the park of Class B to determine a pollution early-warning grade "b" inside the park; and fourthly, taking a highest grade of "a" and "b" as the park early-warning grade.

2. The method of monitoring, evaluating and early-warning soil and groundwater pollution in the industrial park according to claim 1, wherein in Step 2, establishing the groundwater pollution risk evaluating method based on the pollution source load risk, the potential hazard of the pollution sources and the groundwater vulnerability according to the information about the pollution sources and the hydrogeology in the industrial park comprises:

Step 201: evaluating the pollution source load risk according to a pollution source kind, a pollutant production quantity, pollutant release likelihood and a pollution buffer distance in the pollution information, wherein the pollution source kind K, the pollutant production quantity Q, the pollutant release likelihood L and the pollution buffer distance D are acquired, wherein the pollution source kind is divided into industrial pollution sources and other types of pollution sources including petrochemical engineering, coking, chemical raw materials and chemicals manufacturing, electroplating, nonferrous metal smelting, ferrous metal smelting, leather making, paper making, metal product manufacturing, textiles and hazardous waste disposal sites without lining protection, hazardous waste storage sites without lining protection, gas stations, petroleum product storage areas, general waste disposal sites without lining protection, general waste landfill sites without lining protection, general waste landfill sites with high groundwater level, and general waste landfill sites in valleys with low groundwater level;

the pollution sources are classified, graded, and assigned, wherein values of K and D of the petrochemical engineering, the coking and the hazardous waste disposal sites without lining protection are 9 and 2, respectively; values of K and D of the chemical raw materials and the chemicals manufacturing, electroplating and the hazardous waste storage sites without lining protection are 8 and 2, respectively; values of K and D of the nonferrous metal smelting, the gas stations and the petroleum product storage areas are 7 and 1.5, respectively; values of K and D of the ferrous metal smelting and the general waste disposal sites without lining protection are 6 and 1, respectively; values of K and D of the leather making, the paper making and the general waste landfill sites without lining protection are 5 and 1.5, respectively; values of K and D of the metal product manufacturing and the general waste landfill sites with high groundwater level are 4 and 0.5, respectively; values of K and D of the textiles are 3 and 1, respectively; values of K and D of food are 2 and 0.5, respectively; and values of K and D of other industries and the general waste landfill sites in valleys with low groundwater level are 1 and 0.5, respectively;

the pollutant production quantity Q is classified and graded according to a discharge amount of wastewater of industrial sources, a disposal amount of waste disposal sites, a landfill amount of landfill sites, a number of oil tanks in gas stations and petroleum product storage areas, wherein an assignment range of the pollutant production quantity Q is between 1 and 12;

the pollutant release likelihood L comprises a pollutant release likelihood $L_1$ and a likelihood of pollutant reaching groundwater $L_2$, and L is a sum of $L_1$ and $L_2$, wherein the pollutant release likelihood $L_1$ is graded and assigned from 0.1 to 1.0 according to the industrial sources, the waste disposal sites, the landfill sites, the gas stations, the petroleum product storage areas, pollution source historical time and protective measures; and the likelihood of pollutant reaching groundwater $L_2$ is graded and assigned as 1.0, 0.9, 0.8, 0.6, 0.4, 0.2 according to inorganic salt ions, hexavalent chromium, chlorinated hydrocarbons, benzene series, metal ions and other hydrophobic organic substances; and a calculation formula of a load risk index of a single pollution source is:

$$P=K*Q*L*D;$$

Step 202: evaluating the potential hazard of the pollution sources according to nature of pollutants in the pollution information and characteristics of the pollution sources, comprising:

acquiring an evaluation parameter index system of the potential hazard of the pollution sources, including toxicity, mobility, persistence, equal standard load, discharge position, pollution occurrence probability, affected area and pollution duration, and evaluating the potential hazard of the pollution sources according to the evaluation parameter index system of the potential hazard of the pollution sources, that is, calculating a potential hazard index of a pollution source as follows:

$$S_j = \sum_{i=1}^{n} C_{ij} \times Q_{ij},$$

$$C_{ij}=T_{ij}W_T+M_{ij}W_M+D_{ij}W_D+L_{ij}W_L+S_{ij}W_S+P_{ij}W_P+ \\ A_{ij}W_A+C_{ij}W_C,$$

where $S_j$ is quantitative characterization of pollution ability of a pollution source j to groundwater pollution, as hazard of the pollution source; $C_{ij}$ is quantitative characterization of eight self-attributes of an i-th characteristic pollutant of the pollution source j, as hazard of the characteristic pollutant; $Q_{ij}$ denotes a quantity of the i-th pollutant discharged by the pollution source j entering a groundwater environment, as a discharge amount; $T_{ij}$, $M_{ij}$, $D_{ij}$, $L_{ij}$, $S_{ij}$, $P_{ij}$, $A_{ij}$, $C_{ij}$ are quantitative indexes of toxicity, mobility, degradability, equal standard load, discharge position, pollution occurrence probability, affected area and duration of the i-th characteristic pollutant of the pollution source j, respectively; $W_T$, $W_M$, $W_D$, $W_L$, $W_S$, $W_P$, $W_A$, $W_C$ are weight values of toxicity, mobility, degradability, equal standard load, discharge position, pollution occurrence probability, affected area and duration, where $W_T$=0.2650, $W_M$=0.1325, $W_D$=0.1325, $W_L$=0.1100, $W_S$=0.1943, $W_P$=0.0957, $W_A$=0.0350, $W_C$=0.0350;

Step 203: evaluating groundwater vulnerability according to depth to watertable, aquifer net recharge, aquifer material, soil type, topography, impact of vadose zone and hydraulic conductivity of aquifer in the pollution information, comprising:

acquiring groundwater vulnerability evaluation indexes, including depth to the watertable D, aquifer net recharge R, aquifer material A, soil type S, topography T, impact of the vadose zone I and hydraulic conductivity of aquifer C, and using a DRASTIC method for calculation to obtain vulnerability indexes:

DRASTIC=0.22×$D$+0.17×$R$+0.13×$A$+0.09×$S$+0.04×$T$+0.22×$I$+0.13×$C$; and

Step 204: evaluating the groundwater pollution risk according to the pollution source load risk, the potential hazard of the pollution sources and the groundwater vulnerability, comprising:

comprehensively evaluating a groundwater pollution risk of a single pollution source according to the load risk, the potential hazard and the groundwater vulnerability of the pollution source as follows:

$R_i$=$S_i$×$D_i$×$P_i$, where $R_i$ is a comprehensive index of a groundwater pollution risk of an i-th pollution source, $S_i$ is a potential hazard index of the i-th pollution source, $D_i$ is a groundwater vulnerability index of the i-th pollution source, and $P_i$ is a load risk index of the i-th pollution source; and comprehensively evaluating a groundwater pollution risk of a plurality of pollution sources using a function of a grid calculator in geographic information system (GIS) to calculate risk superposition of the plurality of pollution sources with different types, wherein the comprehensive index of the groundwater pollution risk of the plurality of pollution sources is calculated by a formula:

$R$=Σ$W_i$×$R_i$, where R is the comprehensive index of the groundwater pollution risk of the plurality of pollution sources, $W_i$ is a weight of the i-th pollution source, $R_i$ is an index of the groundwater pollution risk of the i-th pollution source, wherein $W_i$ is classified, graded and assigned according to the pollution sources as follows: petrochemical engineering, coking, chemical raw materials and chemicals manufacturing, and electroplating industrial sources are assigned 5, nonferrous metal smelting, ferrous metal smelting, leather making, paper making and metal product manufacturing industrial sources are assigned 4, hazardous waste disposal sites are assigned 3, general waste disposal sites are assigned 2, hazardous waste landfill sites are assigned 4, general waste landfill sites are assigned 3, gas stations are assigned 2, and large-scale petroleum product storage areas are assigned 3.

3. The method of monitoring, evaluating and early-warning soil and groundwater pollution in the industrial park according to claim 1, wherein determining the pollution early-warning grade "a" at the park boundary comprises:

analyzing the early-warning grades of the monitoring points of Class A, and assigning no early-warning 2, low early-warning 6, lower early-warning 10, medium early-warning 16, higher early-warning 20, high early-warning 30, and extremely high early-warning 40; according to a number of monitoring points $k_i$ at the industrial park boundary of Class A, a number of no early-warning points $k_1$, a number of low early-warning points $k_2$, a number of lower early-warning points $k_3$, a number of medium early-warning points $k_4$, a number of higher early-warning points $k_5$, a number of high early-warning points $k_6$, and a number of extremely high early-warning points $k_7$, defining the a total number of monitoring points of Class A as K:

$$K = \sum_{k=1}^{7} ki,$$

and obtaining a pollution early-warning score G of the monitoring points of Class A according to the following formula:

$G$=2×$k_1$+6×$k_2$+10×$k_3$+16×$k_4$+20×$k_5$+30×$k_6$+40×$k_7$;

defining the pollution early-warning grade of the monitoring points of Class A as the grade "a" based on the assignment of different grades, using an early-warning interval index mapping deformation method for partition, wherein 2K≤G<(137K/49) corresponds to no early-warning, (137K/49)≤G<(250k/49) corresponds to low early-warning, (250k/49)≤G<(440k/49) corresponds to lower early-warning, (440k/49)≤G<(706k/49) corresponds to medium early-warning, (706k/49)≤G<(1049k/49) corresponds to higher early-warning, (1049k/49)≤G<(1466k/49) corresponds to high early-warning, and (1466k/49)≤G≤40k corresponds to extremely high early-warning; and determining the pollution early-warning grade "b" inside the park, which comprises:

analyzing the early-warning grades of the monitoring points of Class B, and assigning no early-warning 1, low early-warning 3, lower early-warning 5, medium early-warning 8, higher early-warning 10, high early-warning 15, and extremely high early-warning 20; according to a number and the pollution early-warning grade classification of monitoring points $n_i$ inside the park of Class B, a number of no early-warning points $n_1$, a number of low early-warning points $n_2$, a number of lower early-warning points $n_3$, a number of medium early-warning points $n_4$, a number of higher early-warning points $n_5$, a number of high early-warning points no, and a number of extremely high early-warning points $n_7$, defining a total number of monitoring points inside the park as N:

$$N = \sum_{k=1}^{7} ni,$$

and obtaining a pollution early-warning score S of monitoring points of Class B according to the following formula:

$S$=1×$n_1$+3×$n_2$+5×$n_3$+8×$n_4$+10×$n_5$+15×$n_6$+20×$n_7$, and defining the pollution early-warning grade of the monitoring points of Class B as grade "b" based on the assignment of different grades, using the early-warning interval index mapping deformation method for partition, wherein N≤S<(68N/49) corresponds to no early-warning, $(68N/49) \leq S < (125N/49)$ corresponds to low early-warning, $(125N/49) \leq S < (220N/49)$ corresponds to lower early-warning, $(220N/49) \leq S < (353N/49)$ corresponds to medium early-warning, $(353N/49) \leq S < (524N/49)$ corresponds to higher early-warning, $(524N/49) \leq S < (733N/49)$ corresponds to high early-warning, and $(733N/49) \leq S \leq 20N$ corresponds to extremely high early-warning.

\* \* \* \* \*